(12) United States Patent
Law

(10) Patent No.: US 12,542,286 B2
(45) Date of Patent: Feb. 3, 2026

(54) DEVICE AND METHOD FOR COOLING A HEAT EXCHANGER

(71) Applicant: MTU Aero Engines AG, Munich (DE)

(72) Inventor: Barnaby Law, Starnberg (DE)

(73) Assignee: MTU Aero Engines AG, Munich (DE)

( * ) Notice: Subject to any disclaimer, the term of this patent is extended or adjusted under 35 U.S.C. 154(b) by 295 days.

(21) Appl. No.: 18/029,352

(22) PCT Filed: Sep. 9, 2021

(86) PCT No.: PCT/DE2021/100744
§ 371 (c)(1),
(2) Date: Mar. 29, 2023

(87) PCT Pub. No.: WO2022/068990
PCT Pub. Date: Apr. 7, 2022

(65) Prior Publication Data
US 2023/0356855 A1  Nov. 9, 2023

(30) Foreign Application Priority Data
Sep. 30, 2020 (DE) .................... 10 2020 212 402.7

(51) Int. Cl.
| | | |
|---|---|---|
| *B64D 33/08* | (2006.01) | |
| *B64D 27/355* | (2024.01) | |
| *H01M 8/04007* | (2016.01) | |
| *H01M 8/04014* | (2016.01) | |
| *H01M 8/04111* | (2016.01) | |
| *B64D 27/34* | (2024.01) | |

(52) U.S. Cl.
CPC ...... *H01M 8/04014* (2013.01); *B64D 27/355* (2024.01); *B64D 33/08* (2013.01); *H01M 8/04074* (2013.01); *H01M 8/04111* (2013.01); *B64D 27/34* (2024.01); *H01M 2250/20* (2013.01)

(58) Field of Classification Search
CPC ......... H01M 8/04014; H01M 8/04074; H01M 8/04111; H01M 2250/20; B64D 27/355; B64D 33/08
USPC .......................................................... 165/51
See application file for complete search history.

(56) References Cited

U.S. PATENT DOCUMENTS

| | | | |
|---|---|---|---|
| 6,444,345 B2 | 9/2002 | Sang | |
| 6,519,969 B2 * | 2/2003 | Sauterleute | ............ B64D 13/06 62/401 |
| 9,243,513 B2 | 1/2016 | Hussain et al. | |

(Continued)

FOREIGN PATENT DOCUMENTS

| | | |
|---|---|---|
| DE | 19911018 C1 | 8/2000 |
| DE | 102013106629 A1 | 1/2015 |

(Continued)

*Primary Examiner* — Joel M Attey
(74) *Attorney, Agent, or Firm* — Hinckley, Allen & Snyder, LLP; David R. Josephs

(57) ABSTRACT

The invention relates to a device and a method for cooling a heat exchanger of a fuel cell of a flight propulsion drive outside of a flight phase of an aircraft. The flight propulsion drive has an air line with at least one compressor for feeding compressed air for the operation of the fuel cell. A flow amplifier is arranged in the region of the heat exchanger, and is configured to guide air onto a cooling surface of the heat exchanger, whereby thermal energy is diverted from the cooling surface of the heat exchanger.

10 Claims, 3 Drawing Sheets

(56) References Cited

U.S. PATENT DOCUMENTS

| | | |
|---|---|---|
| 9,797,413 B2 | 10/2017 | Stewart et al. |
| 10,601,057 B2 * | 3/2020 | Itoga ................. B60L 50/72 |
| 2003/0072984 A1 * | 4/2003 | Saloka .............. H01M 8/04014 |
| | | 429/429 |
| 2005/0066680 A1 * | 3/2005 | Hobmeyr ............ F04D 29/5806 |
| | | 62/7 |
| 2005/0095488 A1 * | 5/2005 | Formanski ........ H01M 8/04014 |
| | | 417/244 |
| 2007/0199317 A1 * | 8/2007 | Pelz ....................... F02M 26/33 |
| | | 60/599 |
| 2009/0032130 A1 | 2/2009 | Dumas et al. |
| 2017/0051685 A1 * | 2/2017 | Scotto .................... F02M 27/02 |
| 2017/0166320 A1 | 6/2017 | Rideau et al. |
| 2017/0211474 A1 | 7/2017 | Sennoun |
| 2017/0306846 A1 | 10/2017 | Laing et al. |
| 2018/0040910 A1 | 2/2018 | Chung et al. |
| 2019/0363378 A1 * | 11/2019 | Bellosta Von Colbe .................... |
| | | H01M 8/04753 |
| 2022/0411083 A1 * | 12/2022 | Kierbel ................. B64D 37/30 |

FOREIGN PATENT DOCUMENTS

| | | |
|---|---|---|
| DE | 102018121371 A1 | 3/2020 |
| DE | 112006000193 B4 | 8/2020 |
| FR | 3036140 B1 | 11/2019 |
| GB | 2545246 A | 6/2017 |
| JP | 2002313387 A | 10/2002 |
| KR | 20120114874 A | 10/2012 |
| WO | 2009057977 A2 | 5/2009 |
| WO | 2011042215 A1 | 4/2011 |

* cited by examiner

DEVICE AND METHOD FOR COOLING A HEAT EXCHANGER

BACKGROUND OF THE INVENTION

The invention relates to a device and a method for cooling a heat exchanger of a fuel cell of a flight propulsion drive outside of a flight phase of an aircraft, wherein the flight propulsion drive has an air line with at least one compressor for feeding compressed air for operating the fuel cell.

In flight propulsion drives with fuel cells, large quantities of heat are produced, which must be removed by heat exchangers in order to prevent an overheating of the fuel cells. Correspondingly, heat exchangers of such flight propulsion drives are usually arranged so that downwash air and/or ram air can be used for cooling the at least one heat exchanger. On the ground, outside of a flight phase of an aircraft, there is either no cooling air available or an insufficient amount of cooling air is available. During the operation of fuel cells outside of a flight phase of the aircraft, therefore, an alternative cooling of the heat exchangers is necessary in order to remove sufficient heat from the fuel cells. Additional fans arranged on the aircraft for providing a cooling-air flow on the ground are superfluous during the flight phase and are rather a disadvantage aerodynamically.

SUMMARY OF THE INVENTION

Proceeding therefrom, an object of the present invention is to propose an improved device and a method for cooling a heat exchanger of a fuel cell of a flight propulsion drive outside of a flight phase of an aircraft. According to the invention, this is achieved by the teaching of the independent claims. Advantageous embodiments of the invention are the subject of the dependent claims.

For achieving the object, in a first aspect, a device for cooling a heat exchanger of a fuel cell of a flight propulsion drive outside of a flight phase of an aircraft is proposed, wherein the flight propulsion drive has an air line with at least one compressor for feeding compressed air for operating the fuel cell. In this case, the device has a flow amplifier arranged in the region of the heat exchanger, said amplifier being configured to conduct air onto a cooling surface of the heat exchanger, and a diverting branch disposed in the air line downstream to the at least one compressor, by which branch, compressed air can be conducted to the flow amplifier.

Similar to conventional turbomachines operated with kerosene, a fuel cell of a flight propulsion drive also requires compressed air in order to achieve a high power density. Electrochemical fuel cells convert fuel and oxidizing agents into electrical power and a reaction product. The feeding of ambient air that usually serves as oxidizing agent in the flight propulsion drive for the fuel cell takes place via an air line, which, in addition to the necessary conducting lines, connections, and valves also comprises at least one compressor for compressing intake air from the environment. For compressing air, one or more compressors or compressor stages arranged in series and/or in parallel can be provided. Since the reaction of fuel and oxidizing agent produces heat as well as electrical current, a stack of fuel cells also must be cooled after reaching an operating temperature, in order to prevent any damage to the fuel cells.

Such a cooling usually takes place by at least one heat exchanger connected to a coolant circuit of the fuel cells, said heat exchanger(s) being subjected to fan flow and/or ram air flow during the flight phases. In this case, a particular air flow that flows over a cooling surface of the heat exchanger takes up heat and removes it from the heat exchanger, in particular by convection. Although in the claims and in the description, "the heat exchanger" is given, in the scope of the invention, of course, heat exchanger can also mean several heat exchanger units arranged spatially next to one another and or dispersed, said units also being able to comprise (each one can comprise) several cooling surfaces. In this context, any (top) surface arranged on the heat exchanger, which is heated by the thermal energy that is being removed and from which heat can be removed by an air flow sweeping over it, is designated a cooling surface. Since the fuel cells of the flight propulsion drive are operated, at least partially, also outside of the flight phase, such as, for example, for providing drive power for taxiing on the tarmac or for providing the aircraft with current on the ground, in these phases, a sufficient fan flow or ram air flow is not available for removing thermal energy from the heat exchanger of the fuel cells.

The proposed device has a flow amplifier arranged in the region of the heat exchanger, in order to conduct air onto a cooling surface of the heat exchanger. Outside of the flight phases, fuel cells are usually operated only at reduced power, for which reason only a reduced air input to the fuel cells is necessary. Correspondingly, free compressor power is available, which can be used for cooling the heat exchanger of the fuel cells. For this, the proposed device has a branch disposed downstream from the at least one compressor in the air line of the fuel cell, by which compressed air can be diverted from the air line and can be conducted to the flow amplifier. In this case, the branch can be disposed downstream of a first compressor or of another following compressor, depending on the construction and the capacity of the compressor, particularly also depending on technical control integration of the branch circuit during transition into or out of a flight phase. For example, only a portion of the compressed air available at the branch can be removed by way of the branch or only a portion of the air available in a sub-branch of the compressor can be conducted to the flow amplifier.

The compressed air diverted by way of the branch is fed from there to a flow amplifier disposed in the region of the heat exchanger, the amplifier being configured so as to conduct the air onto a cooling surface of the heat exchanger. The flow amplifier is arranged in the region of the heat exchanger and thus it is in a suitable position for conducting the intensified air flow onto at least one cooling surface of the heat exchanger. In particular, the flow amplifier comprises an air outlet opening with suitable outlet geometry and/or air conducting equipment in order to form an advantageous air flow, particularly with respect to flow velocity and direction for an efficient removal of thermal energy from the heat exchanger. In particular, the compressed air guided through the flow amplifier has a flow velocity after leaving the flow amplifier that is higher than before the flow amplifier. Such a flow amplifier can have different geometries and flow cross sections that are adapted to the specific application site. Correspondingly, the flow amplifier can be adapted to the space that is available, for which reason such flow amplifiers can be disposed also in constricted spaces, for example, and yet can achieve good guidance of air flow. A flow amplifier is particularly configured and arranged so that it does not cause any disadvantage aerodynamically during the flight phase.

As a result, the proposed device makes possible the removal of thermal energy from a heat exchanger of a fuel cell of a flight propulsion drive outside of a flight phase of an aircraft, without additional expensive equipment for producing an air flow, which, during the flight phase is superfluous or is a disadvantage aerodynamically. For removing the thermal energy from the heat exchanger outside of the flight phase, an existing compressor capacity for compressing air, which is not necessary on the ground, is utilized, this capacity being able to be used instead for drawing off excess thermal energy. In this way, only a few additional elements are necessary for cooling the heat exchanger of the fuel cells outside of the flight phases.

In one embodiment of the device, the flow amplifier operates according to the Venturi and/or the Coanda principle, in order to conduct air onto the cooling surface of the heat exchanger. Additionally, in this case, in addition to the compressed air, the device also can conduct ambient air onto the cooling surface of the heat exchanger. For example, the flow amplifier here is constructed such that it can utilize the effect of a (Venturi) jet pump. In this case, the air flow introduced by the compressor forms the propellant, so that additional ambient air can be taken in and accelerated in the region of the flow amplifier before the intensified air flow formed thereby flows to the cooling surface of the heat exchanger. Alternatively or in combination with this construction, the flow amplifier can have, for example, an outlet opening utilizing the Coanda principle, in which the air flow is guided over the surface of a wall structure that expands in a suitable way, to which the air flow clings. A pressure drop results thereby in the center of the outlet opening, by way of which additional ambient air can be taken in and accelerated before the intensified air flow formed thereby flows to the cooling surface of the heat exchanger. By employing the Venturi and/or the Coanda principle(s), the quantity of heat that can be withdrawn from the heat exchanger can be increased.

In one embodiment of the device, a flow control valve is arranged upstream of the flow amplifier; the air flow fed to the flow amplifier can be controlled by this valve. By a flow control valve, the flow through a flow amplifier can be regulated in a simple way, so as to adapt it particularly to the cooling air requirement of the heat exchanger. For example, a flow control valve can be disposed in the branch of the air line.

In one embodiment of the device, the flow amplifier is formed in a ring shape or annularly, at least partially. In such an embodiment, for example, the air flow can be guided through an annular channel, which has on its radial inner side an outlet opening that is directed essentially parallel to the direction of the axis of rotation. In this embodiment, a negative pressure arises in the center of the axially running air flow that is formed thereby, the ambient air being entrained by said negative pressure, which intensifies the air flow formed in the direction of the heat exchanger. With such an embodiment, a directed air flow can be formed with at least a partially circular-shaped cross section.

In one embodiment of the device, the heat exchanger is arranged in the propulsion nacelle. The heat exchanger is thereby positioned particularly in spatial vicinity to the fuel cells arranged in the propulsion nacelle and the coolant supply thereof. In this embodiment of the device, the flow amplifier can be arranged, for example, in the inlet to the propulsion nacelle, so that an air flow streaming out of the flow amplifier axially flows through the propulsion nacelle. In this case, when it flows through the propulsion nacelle, the air flow can utilize the flow paths provided for guiding cooling air during the flight phase, in order to reach the at least one cooling surface of the heat exchanger and to transport the heat taken in there out of the propulsion nacelle.

In one embodiment of the device, the compressor is constructed of multiple stages and the branch is arranged after at least a first stage. The multi-stage compressor for the air supply to the fuel cells can comprise several compressor stages, which are arranged in series and/or in parallel, and which are employed outside of the flight phases, for example, only partially for supplying other equipment of the aircraft with cooling air. For example, outside of the flight phase, individual compressor stages can be shut down, since they are not necessary for compressing the smaller quantity of air required. Correspondingly, the branch for diverting compressed air for the flow amplifier is arranged so that the supply of the flow amplifier is ensured and can be integrated in a suitable way into the control of the compressor.

For achieving the object, in a second aspect, a method for cooling a heat exchanger of a fuel cell of a flight propulsion drive outside of a flight phase of an aircraft is proposed, wherein the flight propulsion drive has an air line with at least one compressor for feeding compressed air for operating the fuel cell. The method comprises the following steps:

compressing air by at least one compressor of the flight propulsion drive;

conducting the compressed air through a flow amplifier onto a cooling surface of the heat exchanger;

taking in the thermal energy from the cooling surface via the air flow; and removing the thermal energy with the air flow.

In the proposed method, first, air is compressed by a compressor of the flight propulsion drive. For example, this can be a compressor that serves for compressing the air necessary for the operation of the fuel cell, the air being supplied to the fuel cells via an air line. Since outside of the flight phases, the fuel cells are usually operated only at reduced power, also only a reduced air input to the fuel cells is necessary. Therefore, free compressor power is available, which can be used for compressing air for cooling the heat exchanger of the fuel cells. In the proposed method, the compressed air is fed to a flow amplifier, which is arranged particularly in the region of the heat exchanger, and which conducts the air onto at least one cooling surface of the heat exchanger.

The flow amplifier models the flow profile of the air flow, particularly with respect to the flow velocity and flow direction, so that as much thermal energy as possible can be taken in and removed from the cooling surface of the heat exchanger. In this way, an efficient withdrawal of thermal energy is produced by the heat exchanger. In particular, the compressed air guided through the flow amplifier has a higher flow velocity after leaving the flow amplifier than before the flow amplifier.

The proposed method thereby makes possible an effortless removal of thermal energy from a heat exchanger of a fuel cell of a flight propulsion drive outside of a flight phase of an aircraft with at least partial use of already present equipment of the flight propulsion drive. The method can be carried out, in particular, with the device that is described in the preceding, the device being able to comprise the features of one or more of the embodiments described for this purpose. In this way, the method also can comprise correspondingly the features and advantages described therefor.

In one embodiment of the method for cooling a heat exchanger, the flow amplifier also conducts ambient air, in addition to compressed air, onto a cooling surface of the heat exchanger. The flow amplifier takes in ambient air thereby, which is accelerated via the air flow conducted to it. The air flow, which is thus additionally intensified, then flows to the cooling surface of the heat exchanger, in order to take up and remove thermal energy from its cooling surface(s). In this way, the quantity of heat that can be removed from the heat exchanger can be increased.

BRIEF DESCRIPTION OF THE DRAWINGS FIGURES

Further features, advantages and application possibilities of the invention result from the following description in connection with the figures. Herein:

DESCRIPTION OF THE INVENTION

Figure 1:
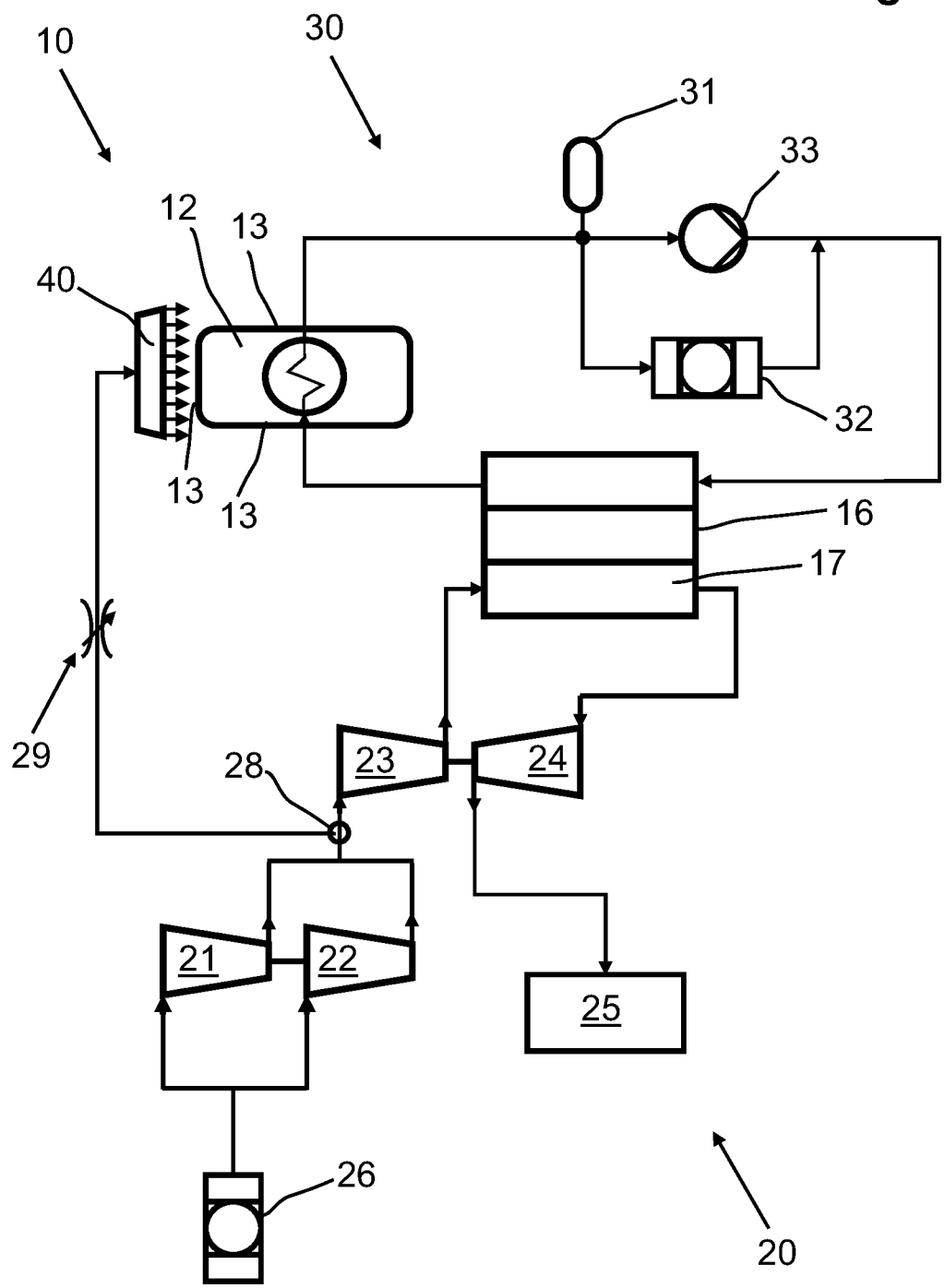
FIG. 1 shows a schematic representation of an exemplary device according to the invention for cooling a heat exchanger of a fuel cell of a flight propulsion drive outside of a flight phase of an aircraft.

FIG. 1 shows a schematic representation of an exemplary device 10 according to the invention for cooling a heat exchanger 12 of a fuel cell 16 of a flight propulsion drive outside of a flight phase of an aircraft. The flight propulsion drive has an air line 20 for providing air to the fuel cell 16. In the exemplary embodiment that is represented, the air line 20 has three compressors 21, 22, 23 or compressor stages 21, 22, 23 for supplying compressed air for operating the fuel cell 16. Two of the compressors 21, 22 or compressor stages 21, 22 are connected in parallel in said exemplary embodiment; an additional compressor 23 or compressor stage 23 is connected in series downstream to the latter. This compressor 23 or compressor stage 23 is additionally propelled by a turbine 24, which is loaded with rotational energy by the air flow guided by the cathode(s) 17 of the fuel cell(s) 16, before the air escapes from the air line 20 by way of the air outlet 25. Ambient air is supplied to the air line 20 via an air filter 26.

The cooling of the fuel cell 16 takes place by way of a cooling circuit 30, which comprises a coolant storage vessel 31, a filter 32, a coolant pump 33, and an air-cooled heat exchanger 12 for cooling the fuel cell 16. In this case, the coolant is pumped from the coolant pump 33 through the fuel cell 16, where it takes up thermal energy. A flight air flow during a flight phase of the aircraft flows over the cooling surfaces 13 of the heat exchanger, and this flow takes away flow energy produced in the fuel cell 16.

In order to remove excess thermal energy from the fuel cell 16 outside of the flight phases, the device 10 has a flow amplifier 40 arranged in the region of the heat exchanger 12 for cooling heat exchanger 12, said amplifier being configured for guiding air onto a cooling surface 13 of the heat exchanger 12. Compressed air from the air line 20 is supplied to the flow amplifier 40, said air serving primarily for supplying the fuel cell 16 during the flight phase and being generally underutilized outside of the flight phase. For this purpose, a branch 28 is arranged in the air line 20 downstream from at least one compressor 21, 22—in said exemplary embodiment, compressors 21 and 22—by which branch, compressed air can be guided to the flow amplifier. In the exemplary embodiment, a flow control valve 29 is arranged upstream of the flow amplifier 40; the air flow fed to the flow amplifier 40 can be controlled by this valve.

Figure 2:
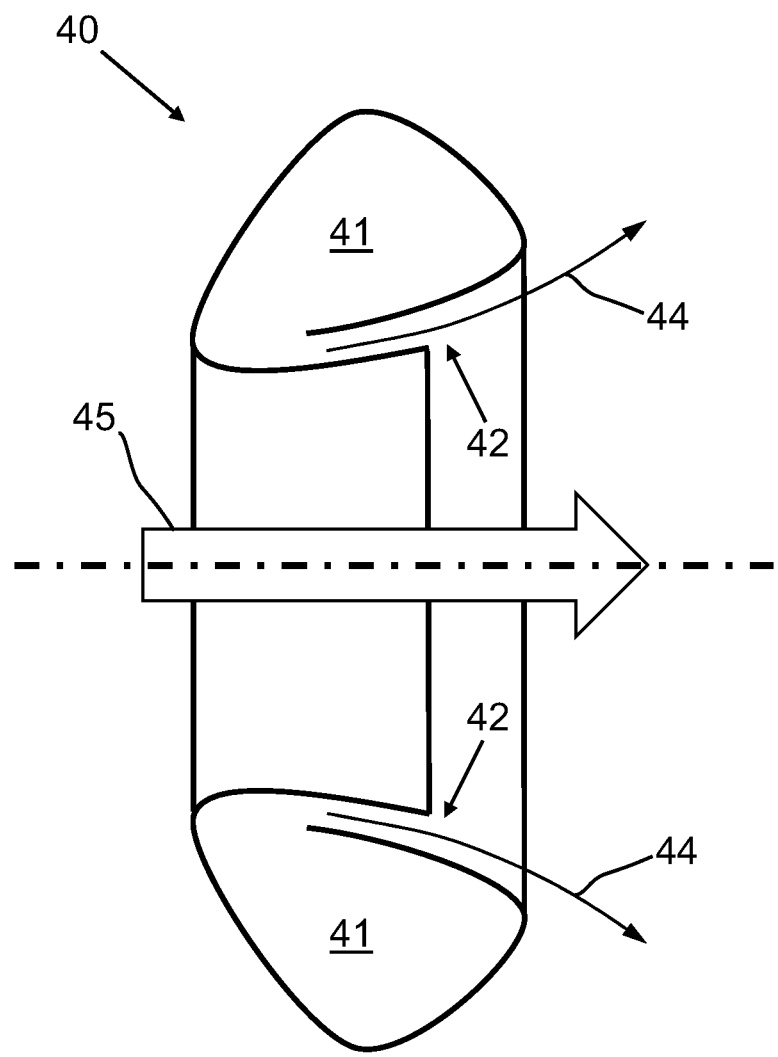
FIG. 2 shows a schematic sectional view of an exemplary flow amplifier.

FIG. 2 shows a schematic sectional view of an exemplary flow amplifier 40, which is annularly configured. The air flow diverted from the air line 20 is guided through an annular air channel 41, which has at its radial inner side, an outlet opening 42 directed essentially parallel to the direction to the axis of rotation. In this case, the air flow is guided over the surface of the expanding wall structure to which the flow 44 clings corresponding to the Coanda principle. A negative pressure is formed here in the center of the flow amplifier 40, by way of which axially additional ambient air 45 is aspirated and accelerated. The intensified air flow, which is formed here, then flows to the cooling surface 13 of the heat exchanger 12, in order to take in and thereby remove thermal energy from the heat exchanger 12.

Figure 3:
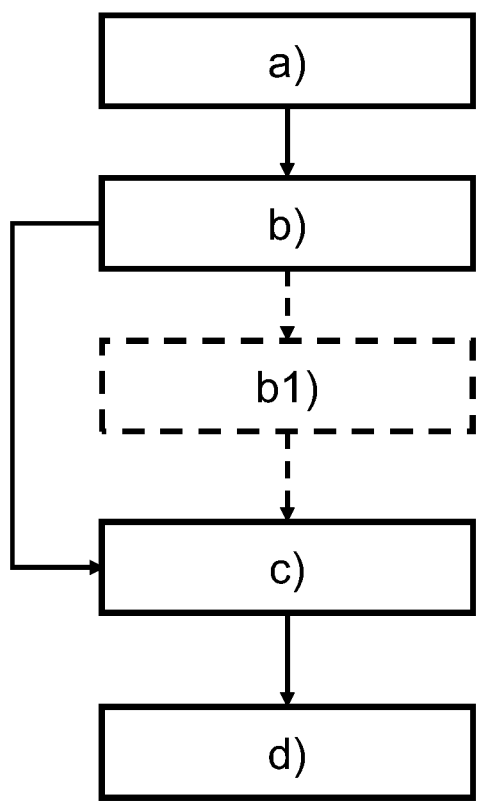
FIG. 3 shows a schematic representation of a flow chart of the method according to the invention.

FIG. 3 shows a flow chart of the method according to the invention for cooling a heat exchanger 12 of a fuel cell 16 of a flight propulsion drive outside of a flight phase of an aircraft, wherein the flight propulsion drive has an air line 20 with at least one compressor 21, 22, 23 for feeding compressed air for operating the fuel cell 16.

The method according to the invention has the following steps: In a first step a), air is compressed with at least one compressor 21, 22, 23 of the flight propulsion drive and in a second step b) is guided by a flow amplifier 40 onto a cooling surface 13 of the heat exchanger 12. In one embodiment of the method, in a step b1), the flow amplifier 40 can also conduct ambient air, in addition to the compressed air, onto a cooling surface 13 of the heat exchanger 40. In a step c), the air flow takes up the thermal energy from the cooling surface 13 of the heat exchanger 12 and in an additional step d) removes this energy from the cooling surface of the heat exchanger.

What is claimed is:

1. A device for cooling a heat exchanger of a fuel cell of a flight propulsion drive outside of a flight phase of an aircraft, comprising:
   the flight propulsion drive having an air line with at least one compressor having an output with a first branch and a second branch downstream of the at least one compressor; the first branch being in fluid communication with the fuel cell for feeding compressed air for operating the fuel cell;
   a cooling circuit loop with coolant therein and being in communication with the fuel cell and having a heat exchanger with a cooling surface in communication with the cooling circuit loop;
   a flow amplifier arranged proximal to the heat exchanger and in communication with second branch of the output of the at least one compressor, the flow amplifier being configured to conduct air onto the cooling surface of the heat exchanger, whereby compressed air is conducted to the flow amplifier from the second branch of the output to cool the heat exchanger and the coolant in the cooling circuit to remove heat from the fuel cell.

2. The device according to claim 1, wherein the flow amplifier operates according to the Venturi and/or the Coanda principles, to conduct air onto the cooling surface of the heat exchanger.

3. The device according to claim 2, wherein the flow amplifier is configured to also conduct ambient air, in addition to the compressed air, onto the cooling surface of the heat exchanger.

4. The device according to claim 1, wherein a flow control valve is arranged upstream of the flow amplifier so that the air flow fed to the flow amplifier can be controlled by this valve.

5. The device according to claim 1, wherein the flow amplifier is formed ring-shaped or annularly.

6. The device according to claim 1, wherein the heat exchanger is arranged in the propulsion nacelle.

7. The device according to claim 6, wherein the flow amplifier is arranged in the inlet of the propulsion nacelle.

8. The device according to claim 1, wherein the at least one compressor includes multiple stages, and the branch is arranged downstream of a first stage.

9. A method for cooling a heat exchanger of a fuel cell of a flight propulsion drive outside of a flight phase of an aircraft, wherein the flight propulsion drive has an air line with at least one compressor having an output with a first branch and a second branch downstream of the at least one compressor; the first branch being in fluid communication with the fuel cell for feeding compressed air for operating the fuel cell, comprising the steps of:

providing a cooling circuit loop with coolant therein and being in communication with the fuel cell and having a heat exchanger with a cooling surface in communication with the cooling circuit loop;

providing a flow amplifier proximal to the heat exchanger and in communication with the second branch of the output of the at least one compressor;

compressing air by at least one compressor of the flight propulsion drive;

conducting the compressed air through the second branch of the output and through the flow amplifier onto the cooling surface of the heat exchanger;

taking up the thermal energy from the cooling surface by the air flow; and removing the thermal energy with the air flow.

10. The method for cooling a heat exchanger according to claim 9, wherein the flow amplifier, in addition to the compressed air, also conducts ambient air onto a cooling surface of the heat exchanger.

* * * * *